United States Patent
Arhab

[11] Patent Number: 6,123,177
[45] Date of Patent: *Sep. 26, 2000

[54] HYDROKINETIC COUPLING DEVICE WITH A BLADE DRIVING MEMBER, PARTICULARLY FOR MOTOR VEHICLES

[75] Inventor: Rabah Arhab, Saint Brice S/Foret, France

[73] Assignee: Valeo, Paris, France

[ * ] Notice: This patent is subject to a terminal disclaimer.

[21] Appl. No.: 08/981,685

[22] PCT Filed: May 6, 1997

[86] PCT No.: PCT/FR97/00805

§ 371 Date: Jan. 7, 1999

§ 102(e) Date: Jan. 7, 1999

[87] PCT Pub. No.: WO97/42432

PCT Pub. Date: Nov. 13, 1997

[30] Foreign Application Priority Data

May 7, 1996 [FR] France ................................ 96 05722

[51] Int. Cl.[7] .................................... F16H 45/02

[52] U.S. Cl. ......................................... 192/3.29; 192/70.18

[58] Field of Search ................................ 192/3.28, 3.29, 192/3.3, 70.18, 70.28, 200

[56] References Cited

U.S. PATENT DOCUMENTS

| | | | |
|---|---|---|---|
| 4,353,444 | 10/1982 | Bionaz | 192/3.29 |
| 5,613,582 | 3/1997 | Jackel | 192/3.29 |
| 5,826,690 | 10/1998 | Maingaud et al. | 192/70.18 |

*Primary Examiner*—Richard M. Lorence
*Attorney, Agent, or Firm*—Liniak, Berenato, Longacre & White

[57] ABSTRACT

A hydrokinetic coupling device having a transversely extending wall with a guide ring securely fastened thereto. A moveable piston is sealingly slidable along the guide ring and rotationally linked to the transverse wall while being moveable via tangential resilient blades secured to a driving member. The driving member is welded to the wall and the blades are attached to the piston by attachment members including a first member secured to the blades and a second member engaging the first member.

6 Claims, 6 Drawing Sheets

HYDROKINETIC COUPLING DEVICE WITH A BLADE DRIVING MEMBER, PARTICULARLY FOR MOTOR VEHICLES

BACKGROUND OF THE INVENTION

1. Field of the Invention

The present invention relates to hydrokinetic coupling apparatus, especially for motor vehicles, such as is described or example in the document WO-A-94/07058.

In that document, the apparatus includes a generally transversely oriented wall which is arranged to be coupled in rotation to a driving shaft, and which carries, fixed thereto, a central guide ring.

A piston is mounted for axial movement sealingly along the guide ring, and defines, with the transverse wall and with the guide ring, a variable volume chamber which is bounded on the outside by a disc, together with friction liners which are adapted to be gripped, respectively, between the piston and the disc and between the disc and the transverse wall.

Each friction liner is fixed to one of the elements consisting of the disc, the piston and transverse wall between which it is adapted to be gripped.

2. Background of the Related Art

It has previously been proposed, in the document FR-A-2 634 849, to couple the piston in rotation to the axially fixed transverse wall, with axial mobility being obtained by means of tangentially oriented tongues which are fixed to a driving member disposed in the variable volume chamber.

In practice, this driving member is in the form of a disc which is fixed by a splined coupling to the guide ring carried centrally by, and fixed to, the transverse wall.

As a result, the fitting of the guide ring on the transverse wall is not as easy as might be desired, because the guide ring is equipped in advance with the disc carrying the tangential tongues coupled to the piston.

In addition, the solution is neither simple nor inexpensive, because of the splined mounting of the disc on the guide ring.

In addition, the feed to the variable volume chamber has to be obtained with the aid of channels which are formed in a known way in the ring, and the channels have to be arranged in such a way as to have regard to the presence of the disc, the nature of this arrangement being such as to increase the axial distance between the piston and the transverse wall.

An object of the present invention is to reduce these disadvantages in a simple and inexpensive way, while continuing to benefit from easy sliding of the piston along the guide ring.

SUMMARY OF THE INVENTION

According to the invention, a hydrokinetic coupling apparatus comprising a lock-up clutch of the type defined above wherein the driving member for the tongues is fixed by welding or adhesive bonding to the transverse wall, and in that the tongues are fixed to the piston with the aid of fastening means which extend generally through the tongues and the piston. The fastening means includes a first part attached to the tongues and bearing on the tongues on the opposite side of the tongues from the piston, together with a second part bearing on the side of the piston opposite to the tongues and being engaged with the first part.

Thanks to the invention, the guide ring is simplified, because no splined coupling need be provided, since the driving member is secured to the transverse wall by welding.

Another result of the invention is that it is possible to locate the feed channels for the variable volume chamber in a desired way because no disc is fixed on the guide ring. This also enables the axial dimension between the transverse wall and the piston to be reduced. In addition, advantage is taken of the configuration of the axially fixed transverse wall. In this connection, this wall has, in its middle part, a portion which projects axially away from the piston with respect to the central part of the wall. It is in this middle wall portion that the driving member is fitted, which enables axial size to be reduced.

The driving member may be positioned with respect to the transverse wall prior to the welding or adhesive bonding, for example with the aid of a removable jig which enables the first part of the fastening means to be centred with respect to the transverse wall. This jig includes for example a centring piece which is fitted into the bore of the central part, and which centres the first part of the assembly means externally.

Thanks to the welding or adhesive bonding, it is thus possible to reduce the tolerances between the kinematic train considered from the driving member to the piston, and in particular the clearance between the first part of the fastening means and the associated holes in the piston. The situation would have been different if the driving member had been secured by riveting to the transverse wall. In this connection, in that case it would have been necessary to increase the above mentioned clearance, because riveting does not enable the driving member to be fixed to the transverse wall with as great precision as does welding.

Thus, the first part of the fastening means extends with a reduced clearance through the associated holes formed in the piston.

Fitting of the drive ring can be effected as a final step. In another version, thanks to the invention it is possible first to weld or adhesively bond the drive member to the transverse wall in the above mentioned way, using the centring jig, and then to fix the guide ring equipped with its sealing ring, and finally to fit the piston over the guide ring before proceeding with the fastening of the tongues to the piston. Thanks to the invention, numerous possibilities for assembly and good positioning of the piston, are obtained because of the above mentioned reduced fitting clearance.

Thanks to all of these arrangements, it can be guaranteed that the piston will slide satisfactorily along the guide ring, that is to say without any risk of jamming. Welding of the driving member to the transverse wall preferably consists of a welding operation of the transparency type performed with a laser. Preferably, the components being welded are rotated with respect to the laser so as to form a weld band.

The following description illustrates the invention with reference to the attached drawings, in which:

DESCRIPTION OF THE PREFERRED EMBODIMENT

Figure 1:
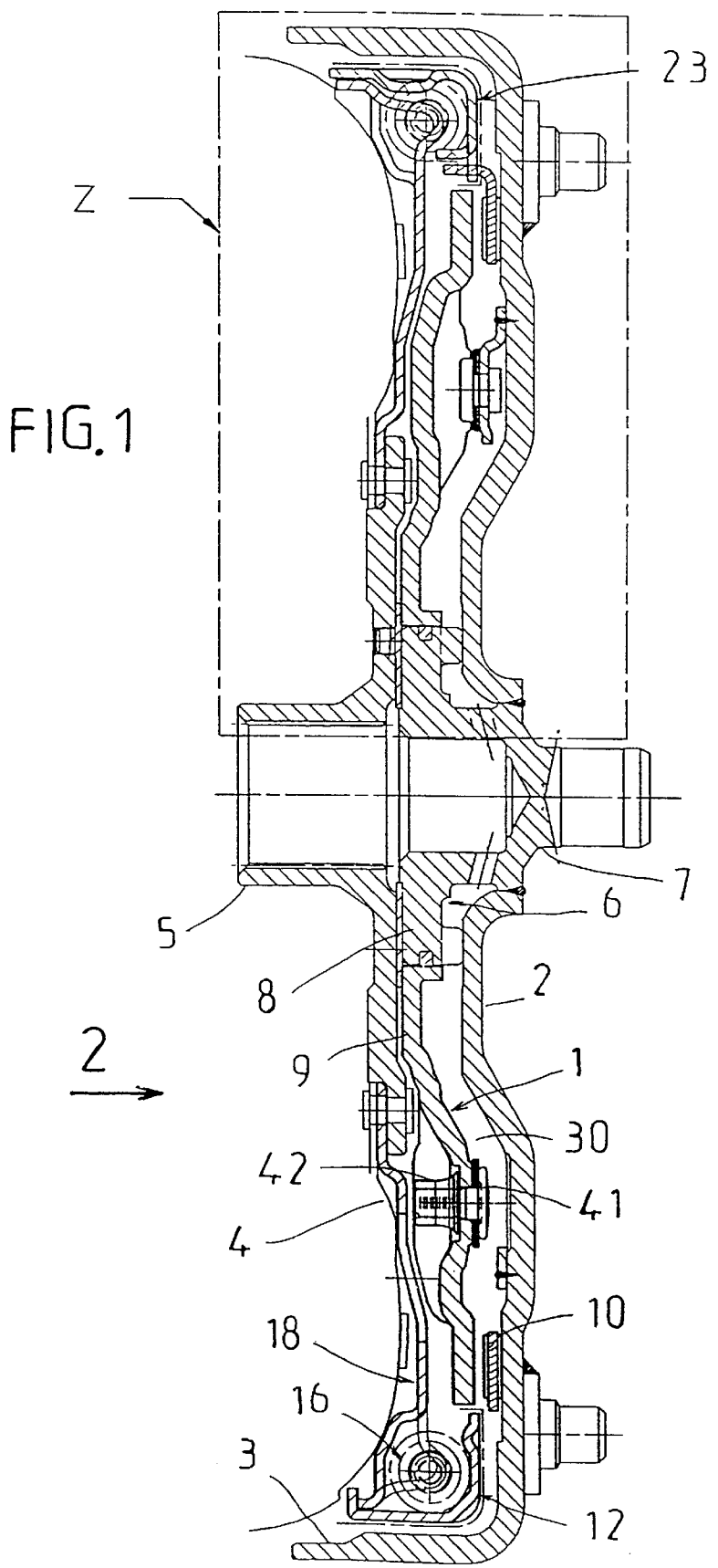
FIG. 1 is a view, in partial axial cross section taken on the line A—A in FIG. 2, of a hydrokinetic coupling device in accordance with the invention, with the lockup clutch being in its disengaged position.

As is known, and as is described for example in the document WO-A-94/07058, to which reference can be made for more detail, a hydrokinetic coupling apparatus includes a torque converter and a lockup clutch 1, arranged in a common sealed housing which is filled with oil and which constitutes a casing.

This casing, which in the present case is of metal, constitutes a driving element and is adapted to be coupled in rotation to a driving shaft, namely the crankshaft of the internal combustion engine in the case of an application to a motor vehicle.

The casing, which is annular in form, consists of two half shells which are arranged facing each other and which are secured together sealingly at their outer periphery, typically by welding.

The first half shell 2, 3 is adapted to be coupled in rotation to the driving shaft, and includes a generally transversely oriented annular wall 2 which is extended at its outer periphery by a generally axially oriented cylindrical wall 3.

The second half shell, which is omitted for simplicity, as is the reaction wheel of the converter, is so configured as to define an impulse wheel having vanes which are fixed with respect of the internal face of that half shell. These vanes lie facing towards the vanes of a turbine wheel 4, which is secured by riveting or welding to a damper plate integral with a hub 5, the latter being splined internally for coupling it in rotation to a driven shaft, namely the input shaft of the gearbox in the case of an application to a motor vehicle. This shaft is hollow internally, so as to define a channel for access of oil to a guide ring 6, which is fitted axially between the hub 5 and the transverse wall 2.

More precisely, the guide ring 6 has in its centre a centring nose 7 which projects axially and which is secured centrally by a weld, the band of weld metal of which is shownsolid, to the wall 2, which for this purpose includes a central, axially oriented sleeve 50 facing outwardly, into which the centring nose 7 penetrates, with the outer periphery of the nose 7 being in intimate contact with the inner periphery of the sleeve 50. The guide ring 6 also has a transversely oriented collar portion 8. The ring 6 is thus shouldered, and is in contact through its collar portion 8, after being secured by welding, with the internal face of the wall 2 that faces towards the hub 5.

A washer 80 of synthetic material is interposed between the hub 5 and the guide ring 6. This washer 80 is carried by the hub 5 by means of pins which are not given a reference numeral.

A piston 9 is mounted for axial sliding movement along the annular outer periphery of the collar portion 8, which is formed with a groove in which an annular sealing ring 29 is fitted. The piston 9 has a central, axially oriented sleeve which faces towards the wall 2 for sliding movement along the outer periphery of the collar portion 8. The piston 9 defines, with the ring 6, the wall 2 and a disc 10, which carries friction liners 11 secured on each of the faces of the disc, for example by adhesive bonding, a variable volume chamber 30 which is fed through the guide ring 6, which for that purpose has holes, not given a reference numeral, which are fed through the channel in the above mentioned driven shaft. In this example, these holes are formed in the collar portion 8, and have inclined portions which are open into a central blind hole formed in the guide ring 6. The disc 10 is fitted at the outer periphery of the piston 9, and has at its outer periphery, radially outside the piston 9, lugs having an axially oriented portion, each of which penetrates into a notch formed at the outer periphery of a guide ring 12. The disc 10 is thus coupled in rotation, while being axially moveable, to the guide ring 12 through a coupling 13 of the tenon and mortice type consisting of lugs and notches.

The notches are formed in a transverse portion 14 of the guide ring 12. This transverse portion 14 is extended by an axially annular portion 15 which serves to hold, radially outwardly, coil springs 16 which are retained internally by an annular retaining portion 17 of a damper plate 18, which is extended inwardly by a plate portion 19, secured by riveting to the flange of the hub 5 at the same time as the turbine wheel 4, which for this purpose is provided with lugs (not given a reference numeral) at its inner periphery.

In another version, this fastening may be obtained by welding. The plate portion 19 has a set of holes (not given a reference numeral), through which oil can flow between the piston 9 and the wheel 4.

The damper plate 18 has abutment portions 20 for the circumferential ends of the springs 16. The portions 20 are formed in sinuous engagement slots which extend from the inner periphery to the outer periphery of the retaining portion 17 of the damper plate 18. This portion 17 is in the form of a half shell, and is offset axially with respect to the portions 14,15 of the guide ring 12, which also constitutes a half shell. The guide ring 12 is provided, at the level of its axial portion 15, with radially inwardly directed integral deformations 21 for engagement by the ends of the springs 16. The portion 14 also has tongues 22 for engagement by the ends of the springs 16. For more detail, reference should be made to the document WO-A-94/07058, and in particular to FIGS. 24 to 28 of the latter.

It will be noted that, apart from the seal 29 and the liners 11, the components of the hydrokinetic apparatus are of metal, usually of press-formed sheet, and that the damper-plate 18 carries the guide ring 12, with the annular portion 15 firstly surrounding an axially oriented flange formed at the outer periphery of the retaining portion 17, and, secondly, having lugs which extend radially inwardly for cooperation with the free end of the flange.

Thus the lockup clutch 1 includes a torsion damper 23 which is fitted mostly between the turbine wheel 4 and the wall 2 of the outer periphery of the first shell, with an input part 12 disposed radially outwardly of the piston 9 and liners 11, and consisting of the guide ring 12 in the form of the half shell 14, 15, together with the coil springs 16, and an output part consisting of the damper plate 18, which is again in the form of a half shell, at its outer periphery.

The output part 18 is coupled in rotation to the turbine wheel 4, and more precisely to the hub 5 of the latter, while the input part 12 is coupled in rotation to the disc 10, projecting radially with respect to the piston 9. The input part 12 is therefore coupled disengagably to the driving shaft via the disc 10 and the liners 11, the disc 10, with its liners 11, being adapted to be gripped disengagably between the piston 9 and the wall 2, which constitutes a counter-piston. The disc 10 is thus coupled elastically to the hub 5 and to the wheel 4.

Figure 4:
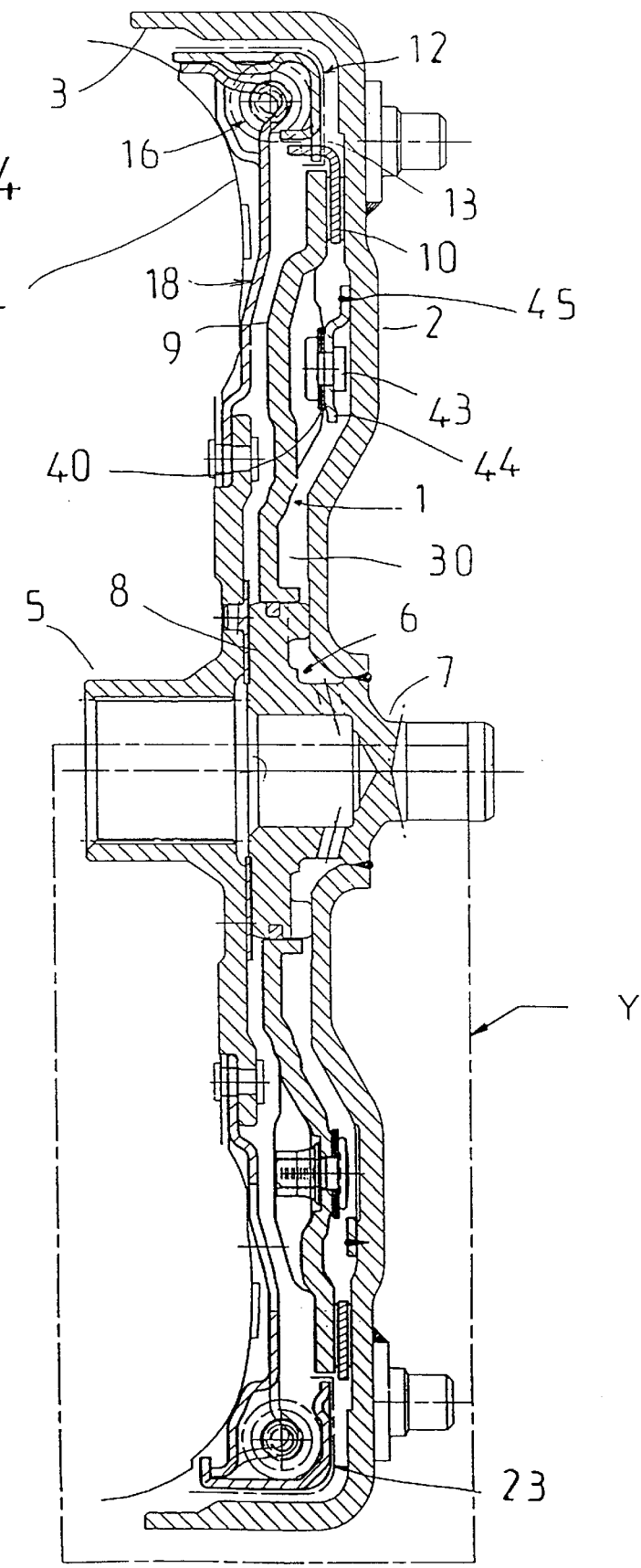
FIG. 4 is a view similar to FIG. 3, for the engaged position of the lockup clutch.
Figure 6:
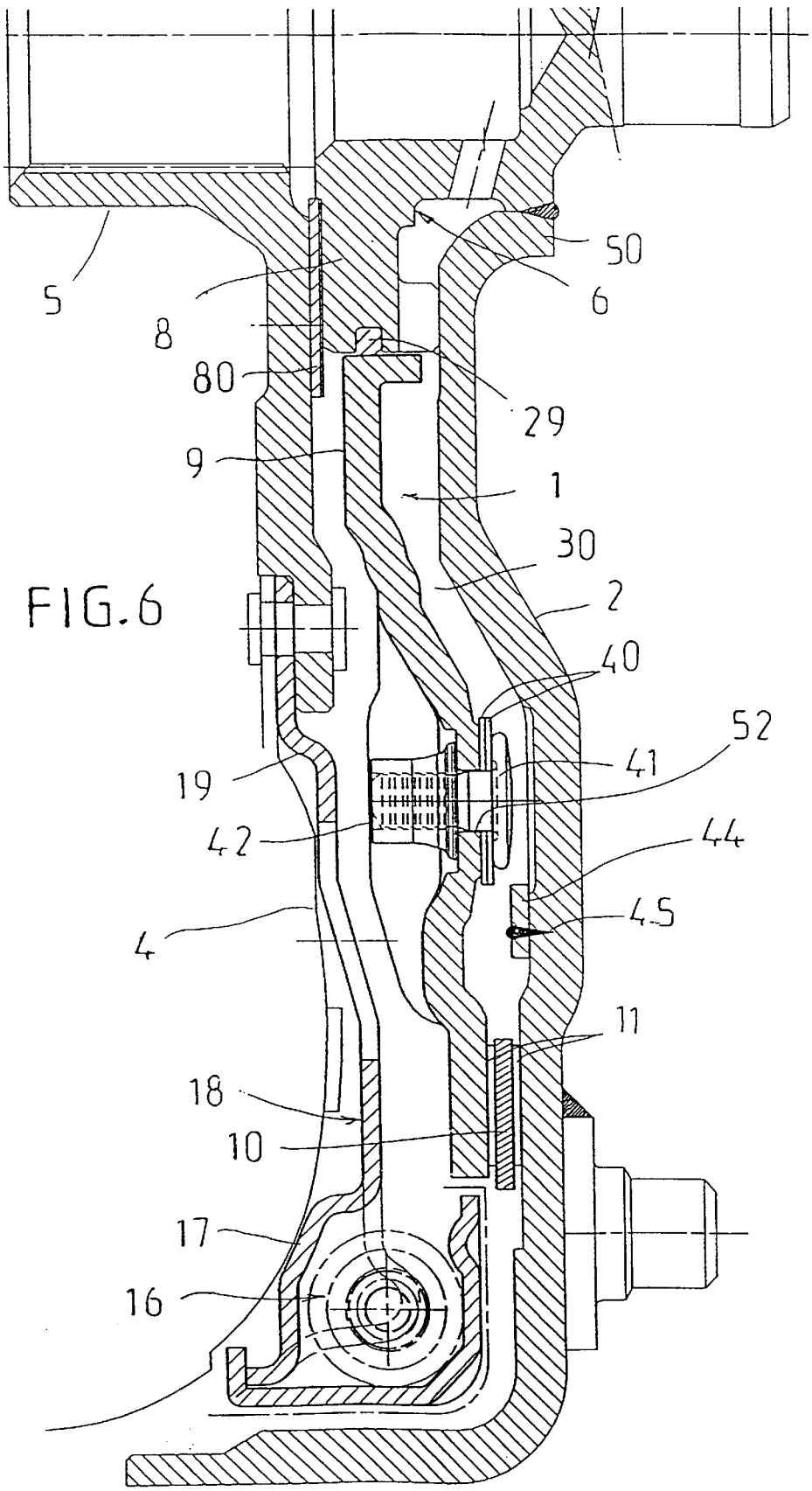

More precisely, the turbine wheel 4 is driven in rotation by the impulse wheel, by virtue of the circulation of fluid contained in the sealed housing or casing, and after the vehicle has been started, in order to avoid sliding effects between the turbine wheel and the impulse wheel, the lockup clutch (FIGS. 4 and 6) enables the driven shaft to be fixed (or coupled) directly to the driving shaft, by gripping of the friction liners 11 and disc 10 between the piston 9 and the counter-piston 2, with the driven shaft being driven directly by the shell 1.

Figure 5:
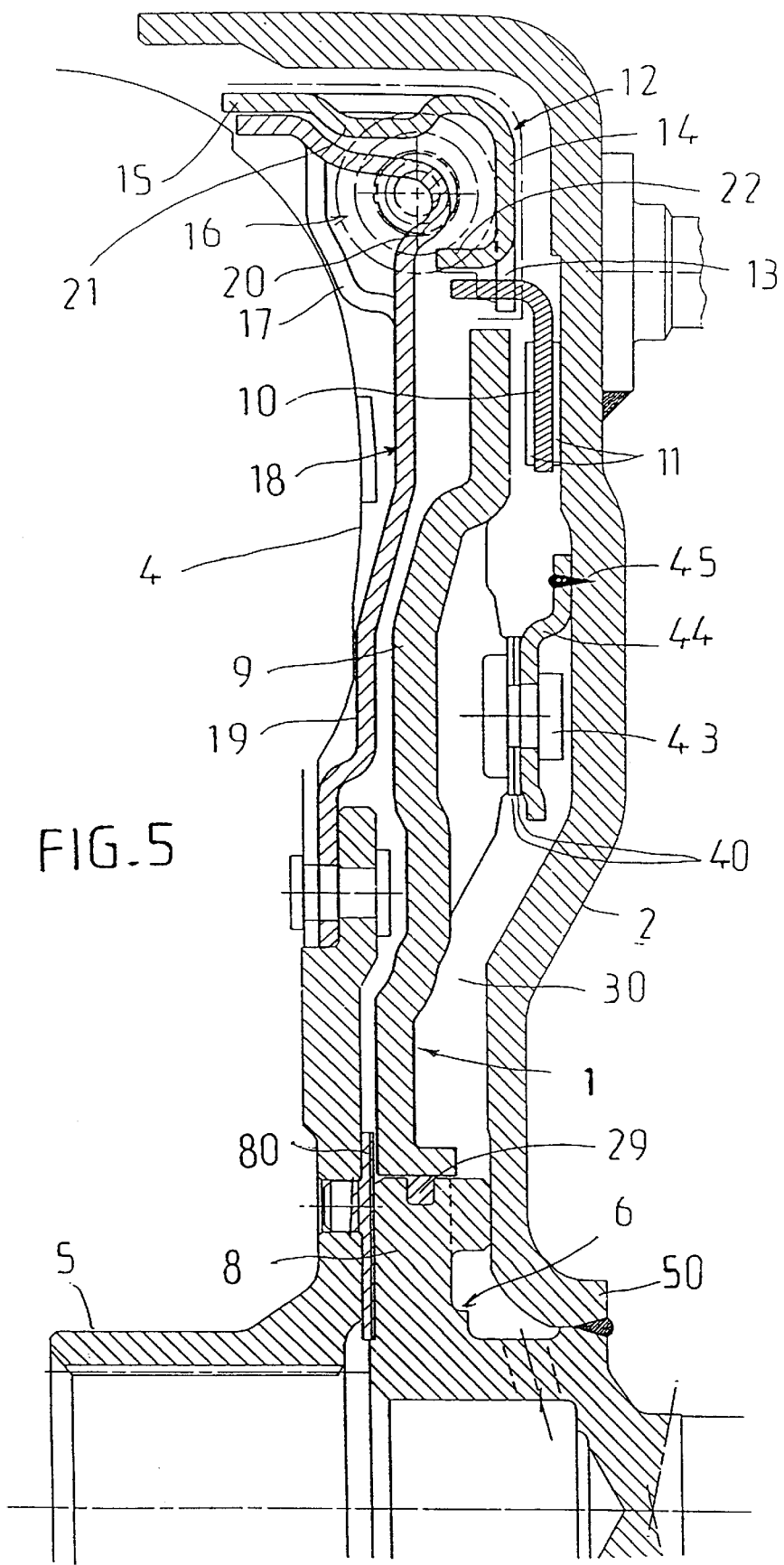
FIGS. 5 and 6 are views on an enlarged scale of the parts indicated by the boxes Z and Y respectively in FIGS. 1 and 4.

In order to disengage the clutch 1 (disengagement of which is shown in FIGS. 1 and 5), a pressure is transmitted into the chamber 30 through the channel in the driven shaft, the blind hole in the guide ring 6, and the holes of the latter. This chamber 30 is sealed by the seal 29 carried by the collar portion 8.

In the position in which the clutch 1 is engaged or coupled (with the liners 11 being gripped as in FIGS. 4 and 6), the chamber 30 is depressurised. This chamber 30 is accordingly bounded on the outside by the disc 10 and the liners 11, with the piston 9 and the wall 2 each having at its outer periphery a flat (transverse) friction face for the liners 11.

In this example, the piston 9 is coupled in rotation to the wall 2 of the first shell by means of tangentially oriented elastic tongues 40 which are spaced apart circumferentially at regular intervals, while being in this example (FIG. 2) four sets of tongues. These tongues 40 enable the piston 9 to move axially with respect to the wall 2. The tongues are attached to the transverse wall 2 through an interposed annular member 44' which is of metal in this example and which is fixed to the wall 2, in accordance with the invention, by adhesive bonding or welding at 45. The annular member 44 has, from place to place on its inner periphery, lugs 48 which are offset axially with respect to its main portion, by which it is fastened to the wall 2. The tongues 40, which in this example are arranged in a stack of two tongues, are fixed at one of their ends to the lugs 48 by means of rivets 43. In another version, the rivets may be replaced by screws or bolts.

The member 44 therefore carries the tongues and constitutes a member for driving the latter in the manner to be described below.

For attachment of the other end of the tongues 40 to the piston 9, in accordance with one feature, fastening means 41,42 are used, which, while being adapted to pass generally through apertures in the tongues 40 and the piston 9, comprise two parts, namely a first part 41, which is fitted in advance to the tongues 40, from the side of the latter opposite to the piston 9, and a second part 42, which, for engagement with the first part 41, only needs to be on the same side as the piston 9. The tongues 40 lie in the space that extends radially between the frictional liners 11 and the axis of the assembly, that is to say in the chamber 30.

The tongues 40 therefore extend axially between the wall 2 and the piston 9. The lengthwise direction of the tongues 40 is generally tangential with respect to a circumference of the apparatus.

It will be noted that advantage is taken of the construction of the transverse wall 2, which leaves open an enlarged space for the variable volume chamber 30 in its middle region.

In this connection, as can be seen in the drawings, a larger gap exists-between the middle part of the wall 2 and the middle portion of the piston, in facing relationship with it, than between the inner periphery of the piston 9 and the central portion of the wall 2.

In this example, the two-part fastening 41, 42 is of the upset bolt shank type. The first part 41 comprises a shank with an engagement head. The shank extends, with a clearance, through the hole 52 in the piston 9, and comprises a smooth first portion and a second portion formed with reliefs. The part 41 is force-fitted, or, in another version, fitted by rolling or adhesive bonding, to the tongues 40.

The first part 41 therefore acts on the side of the tongues 40 opposed to the piston 9, with the heads of the parts 41 bearing on the faces of the tongues 40 that face towards the wall 2

The second part 42 consists of a securing bush which includes, on the same side of the piston, a base portion of enlarged diameter, to prevent it from undergoing plastic flow into the hole in the piston.

The second part 42 therefore acts on the side of the piston 9 opposite to the tongues 40, outside the chamber 30.

As will have been understood, the bush 42 is upset so that the latter-comes into gripping engagement with the portion of the shank 41 formed with reliefs. In another version, pop rivets may be used.

In a further version, the first part may consist of a nut or a screw, which is secured to the tongues 40, for example by adhesive bonding, while the second part consists of a screw or a nut.

All of the arrangements described in the document FR-A-27 26 620 can be envisaged, given that, in order to make engagement with the first part 41, the second part 42 has no need to act on the side of the piston 9. Preferably, the tongues 40 are equipped with the first part 41 of the fastening means in advance, in the manner described above.

The smooth first portions of the shanks 41 are for example force-fitted to the tongues 40, the portion being force-fitted into the corresponding holes (which have no reference numeral) in the tongues 40, with the heads of the shanks, bearing against the surface of the tongues that faces towards the wall 2, having a thickened portion at that level, that is to say in its middle part.

The assembly operation is as follows:

First of all, the tongues 40 are attached to the axially fixed wall 2.

For this purpose, a sub-assembly is constructed, comprising the driving member 44 and the tongues 40, attached by means of the rivets 43 on the lugs 48 of the member 44, the first part 41 of the fastening means 41, 42 being attached to the lugs 40 in the way described above. This sub-assembly is then attached on the wall 2, at 45, by adhesive bonding or welding. Preferably such welding is of the transparency type carried out with a laser, that is to say without any addition of material.

Figure 2:
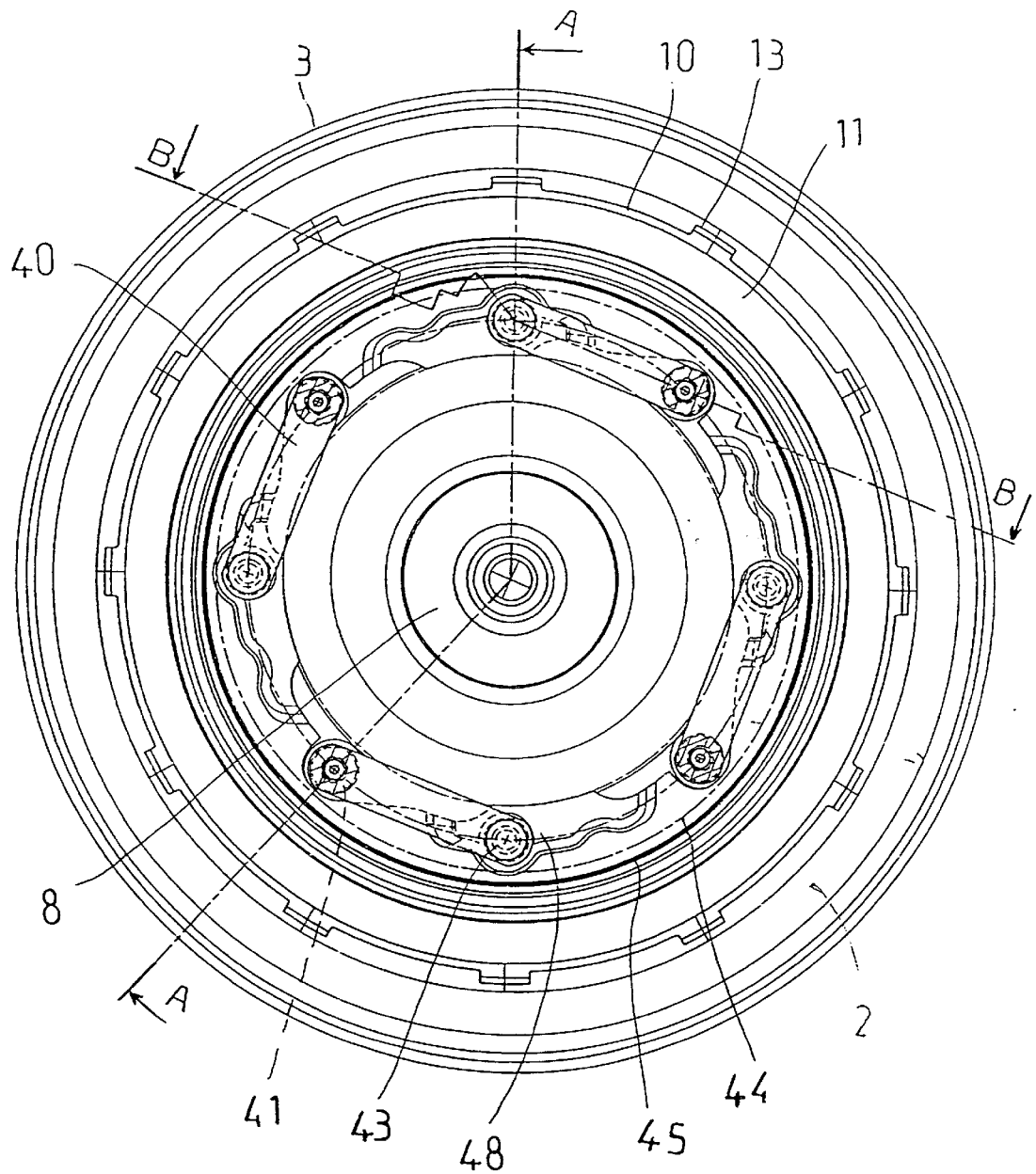
FIG. 2 is a view in the direction of the arrow 2 in FIG. 1, shown partly cut away and showing the tongues, with the turbine wheel, the hub, the piston and the torsion damper of the apparatus all being omitted.
Figure 3:
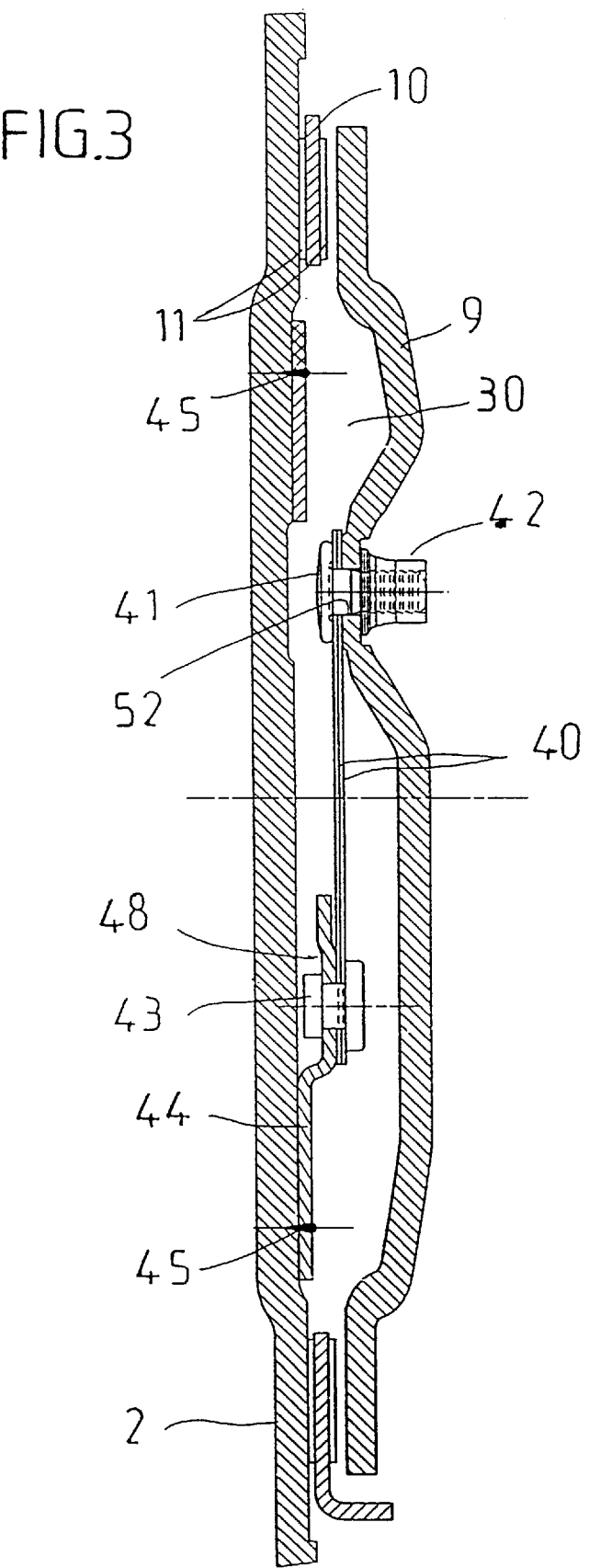
FIG. 3 is a view in the direction of the line B—B in FIG. 2.

This welding operation causes a continuous weld band to appear, as can be seen best at 45 in FIG. 2. In this example it is performed from the same side as the chamber 30, that is to say from the same side as the wall 2 facing inwards and therefore towards the turbine wheel. The weld extends through the driving member 44 and through a small part of the thickness of the wall 2.

In the welding or adhesive bonding operation, a jig with a removable centring piece is used, to enable the driving member 44 for the tongues 40 to be properly positioned with respect to the wall 2 before the welding or adhesive bonding operation.

For example, advantage is taken of the central sleeve 50 of the wall 2, The centring piece of the jig is then engaged in the sleeve 50, and is configured externally so as to centre the first part 41 of the fastening means 41, 42.

The centring piece includes, for example, a collar at its outer periphery, which has a hole for engagement and centring of the shanks 41 that constitute the first parts.

Thus, with the aid of the centring piece, the member 44 is precisely positioned with respect to the wall 2, after which the welding operation is carried out, and finally the jig is removed.

Engagement of the piston, through by the holes 52, with the first part 41 of the fastening means 41, 42 carried by the tongues is then effected.

This engagement of the piston on the first part 41 is obtained with the use of a further centring piece engaged in the sleeve 50, thus ensuring an associated centring of the piston 9 with respect to the fixed part 2.

Thanks to the centring obtained in this way, the piston 9 finds its correct position by virtue of the reduced clearance, resulting from the invention, that exists between the holes 52 and the shanks of the first part 41 of the fastening means, so that the piston 9 will subsequently engage correctly with sliding movement on the guide ring 6. It is then sufficient to ensure the positioning of the second part 42 of the fastening means, that is to say to engage, for example on the shanks 40 of the first part 41, the bushes that constitute the second part 42 until the latter come into abutment on the piston 9.

With the aid of a specialist tool, radial upsetting of the second part 42 on the portions of the shanks of the first part 41 having reliefs, is performed so as to secure the bushes on the portions formed with reliefs.

Finally, the centring piece is withdrawn and the guide ring 6 is engaged, with its seal 29, in the piston 9 (i.e. in the internal bore of the sleeve of the piston 9), and finally the ring 6 is welded on the end of the sleeve 50.

This welding is carried out for example by laser welding, and gives rise to a weld ring. In another version, fastening is obtained by adhesive bonding, which produces a ring of adhesive.

As will have been understood, the invention reduces the tolerances that exist between the driving member 44 and the piston, so that the latter slides correctly on the ring 6, which is accordingly of simple form, being fitted for example as a final step.

In a modified version, thanks to the invention and the resulting reduction in tolerances, after the welding or adhesive bonding operation of the driving member, it is possible to fix the guide ring 6 to the wall and then to fit the piston over the latter and over the shanks 41, with the bush 42 being finally secured with the aid of the specialist tool.

The present invention is of course not limited to the embodiment described. In particular, the coupling of the piston 9 in rotation with the first half shell 2,3 may be obtained by means of the tongues 40 integral with the driving member 44, as is described for example in FIG. 7 of the document FR-A-27 26 620, so that the presence of the rivets 43 is not necessary.

This arrangement also enables the tolerances to be reduced. In general terms, the liners 11 are gripped directly or indirectly between the piston and the wall 2.

In another version, the friction liners 11, instead of being secured by adhesive bonding or brazing of the disc 10, may be secured respectively to the piston 9 and to the wall 2, for example by adhesive bonding or brazing, in such a way that each friction liner is fixed to one of the elements, consisting of the piston and the transverse wall, between which it is arranged to be gripped.

It is of course possible to reverse the structure of the coupling 13, with the disc 10 then having mortices in which tenons of the guide ring 12 are engaged.

In a modified version, the disc 10 may be coupled through a coupling of the tenon and mortice type to a crown which is attached on the turbine wheel 4. In that case, the disc 10 is coupled rigidly to the turbine wheel 4.

The seal 29 may be carried by the piston 9, and more precisely by the sleeve of the latter. The torsion damper 23 may have a different form, for example that which is described in the patent U.S. Pat. No. 5,209,330.

As described for example in the document FR-A-27 34 037, it is of course possible to provide abutment means which face towards the transverse wall 2 and which are carried by one of the components consisting of the transverse wall 2 and the guide ring 6, in order to limit the movement of the piston 9 away from the transverse wall 2.

These abutment means may be fitted outside the variable volume chamber, and may for example consist of an annular member fixed to the guide ring, and more precisely to the dorsal face of the guide ring 6 that faces away from the transverse wall.

In another version, these abutment means may be fitted inside the variable volume chamber and be formed by press forming in the lugs 48 which are offset axially with respect to the main portion of the inner driving member 44.

The positioning of the member 44 can of course be different, for example using a removable centring piece which acts between the inner periphery of the wall 3 and the outer periphery of the member 44. In a further modification, the centring piece is engaged in the sleeve 50 and makes intimate contact with the inner periphery of the lugs 48 of the driving ring 44.

In another modified version, the transverse wall 2 can be machined or stamped out so as to form annular surfaces which, for example, enable the outer periphery of the member 44 to be centred with respect to the wall 2.

In a further version, welding by transparency can be carried out on the other side of the transverse wall 2, to extend into the thickness of the wall 2 and locally into the wall of the driving ring.

The solution of FIGS. 1 to 6 is of course preferable because the driving member 44 is thinner and therefore easier to heat. The laser is preferably fixed, and the components to be welded are displaced so as to form the continuous weld ring 45.

What is claimed is:

1. A hydrokinetic coupling apparatus, comprising a generally transversely oriented wall (2) adapted to be coupled in rotation to a driving shaft and which carries a guide ring (6) fixed centrally thereto, a piston (9) mounted sealingly for axial movement along the guide ring (6) and defining, with the ring (6) and the transverse wall (2), a variable volume chamber (30) which is bounded on the outside by a disc (10), and friction liners (11) which are adapted to be gripped respectively between the piston (9) and the disc (10), and between the disc (10), and the transverse wall (2), each friction liner (11) being fixed to one of the disc (10), the piston (9) and the transverse wall (2), wherein the piston (9) is coupled in rotation to the transverse all (2), with axial mobility, by means of interposed tangential resilient tongues (40) fixed to a driving member (44), wherein the driving member (44) for the tongues (40) is fixed to the transverse wall (2), and the tongues (40) are fixed to the piston (9) with the aid of fastening means (41, 42) which extend generally through the tongues (40) and the piston (9), the fastening means comprising a first part (41) attached to the tongues (40) and bearing on the tongues (4) on the opposite side from the piston (9), together with a second part (42) bearing on the side of the piston (9) opposite to the tongues (40) and being engaged with the first part (41).

2. Apparatus according to claim 1, wherein the tongues are welded to the transverse wall, the weld is of a transparency type performed with a laser and producing a continuous weld band (45).

3. Apparatus according to claim 1, wherein the first part (41) of the fastening means (41, 42) includes shanks applied to the tongues (40) and adapted to extend through holes (52) formed in the piston (9).

4. Apparatus according to claim 3, wherein the second part (42) of the fastening means (41, 42) includes bushes (42) engaging with a portion of the shanks which is formed with reliefs.

5. Apparatus according to claim 3, wherein the driving member (44) is positioned prior to being fixed to the transverse wall with the aid of a removable jig having a centring piece centring the shanks (41) of the first part of the fastening means with respect to the transverse wall (2).

6. Apparatus according to claim 5, wherein the centring piece is engaged in a central sleeve (50) of the transverse wall (2) for fitting of the guide ring (6).

* * * * *